United States Patent [19]

Song

[11] 4,322,582
[45] Mar. 30, 1982

[54] LIQUID-SEALED TYPE OF A GOVERNOR FOR TELEPHONE DIAL

[75] Inventor: Ki W. Song, Seoul, Rep. of Korea

[73] Assignee: Kyung Hwan Cheong, Seoul, Rep. of Korea

[21] Appl. No.: 51,067

[22] Filed: Jun. 22, 1979

[30] Foreign Application Priority Data

Jun. 22, 1978 [KR] Rep. of Korea ............ 0.3337/78[U]

[51] Int. Cl.³ .......................................... H04M 1/315
[52] U.S. Cl. ................................................. 179/90 R
[58] Field of Search ....................... 179/90 R, 90 FW

[56] References Cited

U.S. PATENT DOCUMENTS 2,767,251 10/1956 Alexandersson ................. 179/90 R
2,810,789 10/1957 Huffman ........................... 179/90 R

*Primary Examiner*—Gerald L. Brigance
*Attorney, Agent, or Firm*—Cantor and Singer

[57] ABSTRACT

An improved governor device for a telephone dial which includes a rectangular hexahedral chamber provided with a rack engaged with a pinion and a cylindrical chamber provided with a piston secured to said rack at one end and having a valve system. The two chambers are filled up with a certain liquid such as silicone oil in order to afford a resistance to the piston. The piston can move either way upon dialing and at this time due to the resistance from the liquid the piston can reciprocate without any noise within a certain interval.

1 Claim, 5 Drawing Figures

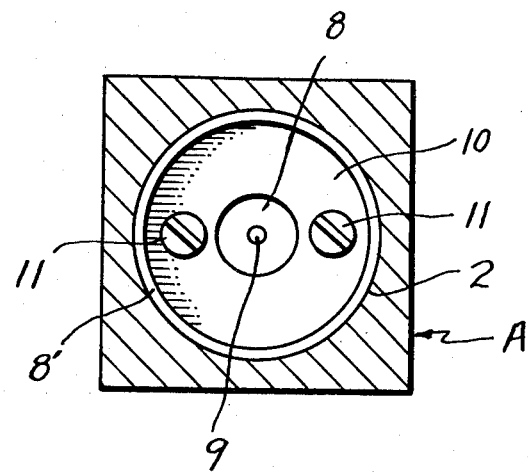
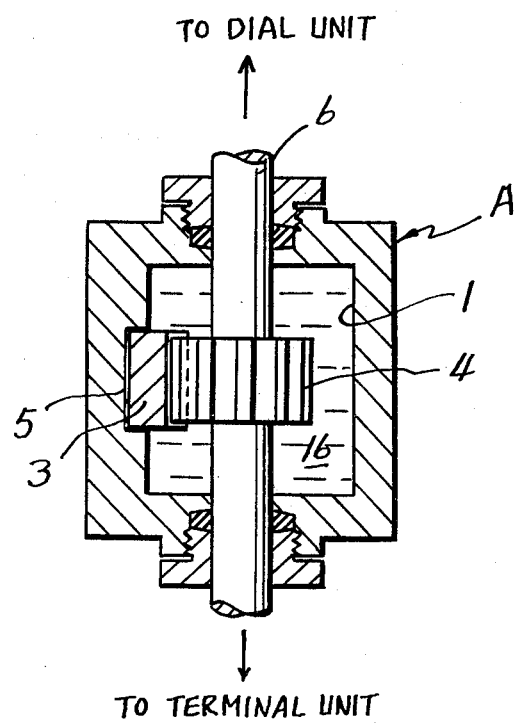

LIQUID-SEALED TYPE OF A GOVERNOR FOR TELEPHONE DIAL

BACKGROUND OF THE INVENTION

1. Field of the Invention

This invention relates to the field of a governor for a telephone dial. More particularly, this invention relates to an improved governor for a telephone dial which is composed of a liquid-sealed type of chamber.

2. Description of the Prior Art

The governor for a telephone dial used hitherto is composed of a series gears and springs. The convention governor for a telephone dial has been somewhat improved by the Korean Utility Model Registration No. 14,459 which was granted to the inventor, in which a certain dimension of cylindrical liquid-sealed chamber is provided immediately beneath the dial base, said liquid having a suitable viscosity, and rotating blades protruding from the rotating-axis of the telephone dial are rotated within the liquid upon dialing and it ensures that said axis can be returned back by the power of resistance of said liquid. Accordingly, in the comparison with the conventional gear-type timer governor for a telephone dial, such a liquid-sealed timer governor has the advantage that the governor can be simply constructed and readily manufactured. Moreover its durability and shock-resistance are excellent. Furthermore, in the liquid-sealed governor there are no gears used and therefore, noise due to gear-engaging can be prevented. However, since this prior liquid-sealed governor comprises a single cylindrical chamber in which a liquid is contained and blades which are fitted to the main rotating axis of the dial are positioned within the liquid, a uniformly accurate return back of the dial may not be achieved.

SUMMARY OF THE INVENTION

This invention relates thus to a governor for a telephone dial which is an improvement over said prior liquid-sealed governor. In other words, in this invention, the advantages and effects of use of a liquid-sealed chamber are maintained as they are, while instead of the rotating blade system, a piston system with a flexible valve is employed.

According to the invention, the liquid chamber is divided into two chambers, one being a right cylinder and the other being a rectangular hexahedron. These two chambers are directly connected to each other without any partitions therebetween. There is no limit in the dimensions of the two chambers. It is however preferred to divide the chambers for receiving a certain liquid such that the proportion of length thereof is of approximately 1:1.5.

There may be listed suitable liquids to use in this invention, such as water, vegetable, mineral or synthetic oils and the like. According to the invention, it is preferable to use a specific silicone oil.

It is the primary object of this invention to provide a governor for a telephone dial which has a liquid-sealed chamber for the time-controlling unit thereof.

It is another object of the invention to provide a governor for a telephone dial which allows the dial to be dialed without generating noises from the friction of gears.

Still another object of the invention is to provide such a governor which can be of a simple structure and can be easily manufactured.

These, together with other objects and advantages, will become apparent to those skilled in the art upon reading the details of construction and operation which are more fully set forth below, reference being made to the accompanying drawings forming a part of this application, wherein like numerals correspond to like parts.

BRIEF DESCRIPTION OF THE DRAWINGS

FIG. 4 is a cross-sectional view cut along the line B—B of FIG. 3; and

FIG. 5 is a cross-sectional view cut along the line C—C of FIG. 3.

DESCRIPTION OF THE PREFERRED EMBODIMENTS

Figure 1:
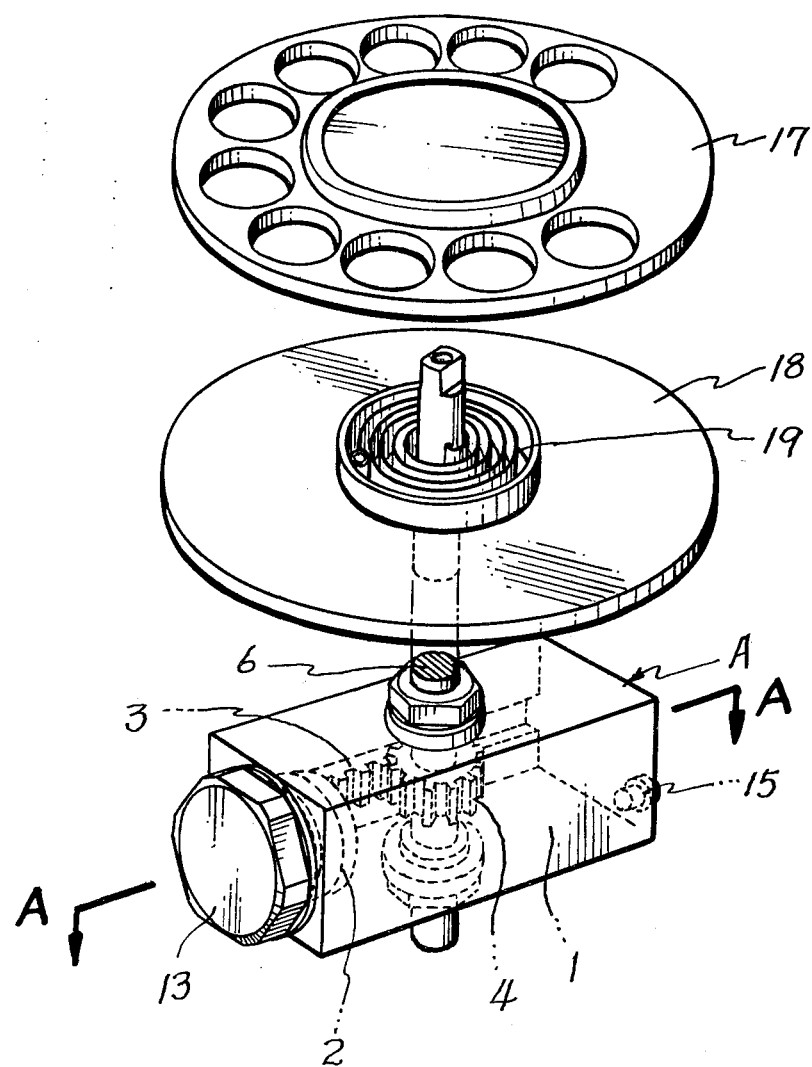
FIG. 1 is a perspective view of the governor for a telephone dial of the present invention, showing each of the sections thereof.

Referring now to the drawings and in particular to FIG. 1, there is shown a perspective view of the governor A according to the invention. The governor A is divided into two chambers 1 and 2, the latter being of a right cylinder and the former being of a rectangular hexahedron. The chamber 1 contains therein a rack 3 and a pinion 4, the rack 3 being engaged with the pinion 4 and can be moved to either side in rack guide recess 5 which is formed on one of the inner side walls of the chamber 1. The upper part of the governor A of the invention is connected to a conventional telephone dial unit which is composed of a dial 17 and a dial base 18 via a vertical axis 6 which is secured to the pinion 4. While, the lower end of said governor A is fixed to a gear in the terminal unit not shown.

The inner constructional view and the functional action of the governor A of this invention will be further illustrated in detail by FIG. 2 as set forth below.

Figure 2:
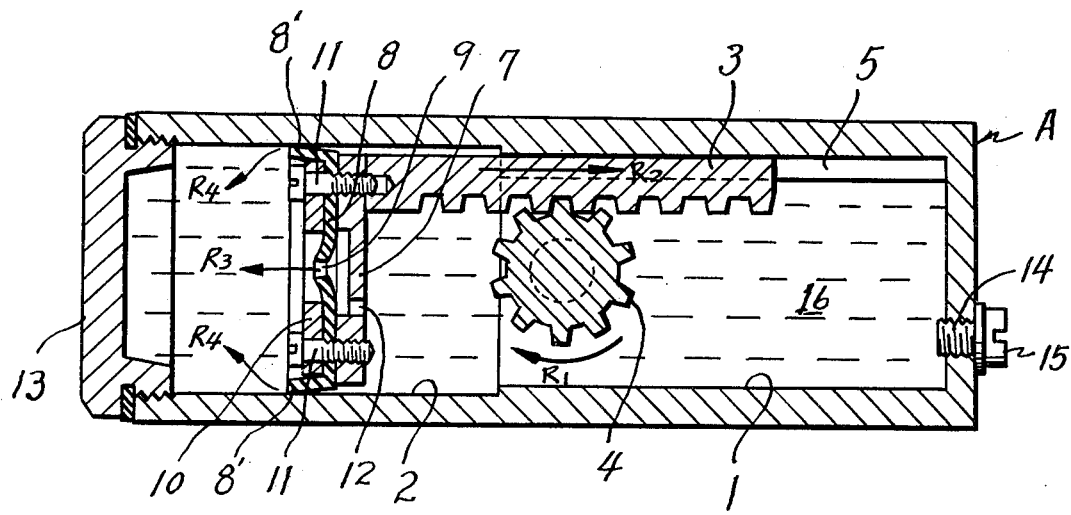
FIG. 2 is a cross-sectional view of the timer of the present invention cut along the line A—A of FIG. 1, showing the rearward position of the piston disposed within a liquid-sealed chamber.
Figure 3:
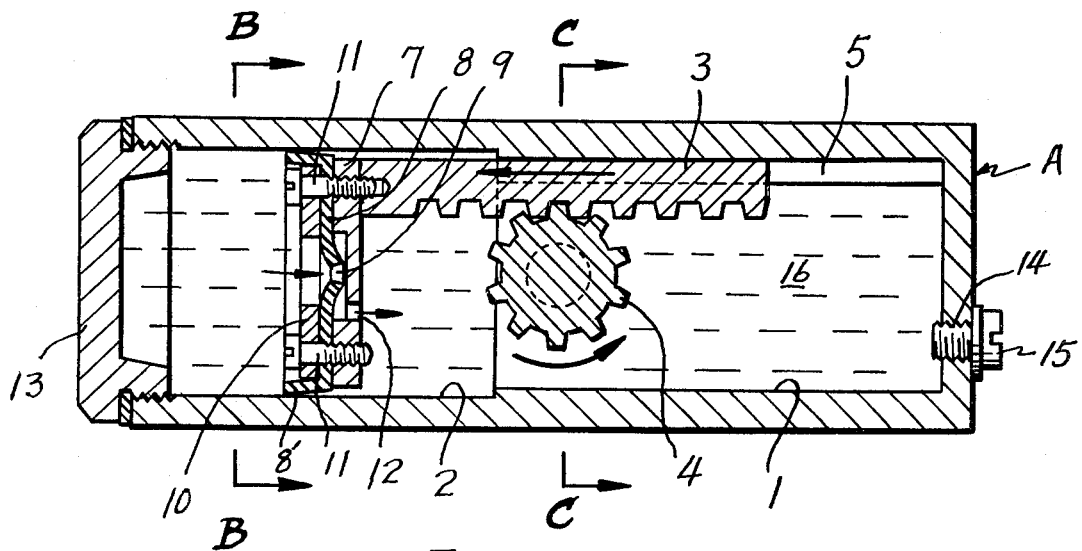
FIG. 3 is the same view as shown in FIG. 2, except for showing the forward position of the piston.

In FIG. 2, the governor A, as already mentioned above, is divided into the chambers 1 and 2. The rack 3 is recessed in the recess 5 horizontally formed on a vertical side wall of the chamber such that it can be engaged with the pinion 4. The other chamber 2 is equiped with a piston 7 which is integrally connected to the rack 3 at one end thereof by means of a bolt 11. The piston 7 is provided with a flexible rubber plate acting as a valve, the peripheral edges of which are folded outwardly to a direction as shown in FIGS. 2 and 3. The plate 8 is integral secured to a circular compressive supporting plate 10 via bolts 11. The plate 8 also has a small hole 9 in the exact center portion thereof and through which a liquid can pass as described hereinafter. The piston 7 also has a small hole 12 which should be preferably positioned lower than the hole 9.

The above members are introduced and assembled through the open end of the governor body A and when the assembling of said members is completed, the open end is tightly and firmly secured by a closure 13 and then through an opening 14 a certain desired liquid 16 e.g. silicone oil introduced into the chamber 1 until this chamber 1 is filled up. Upon the completion of the introduction, the opening 14 is tightly and firmly closed by screw 15.

It will be now noted that the governor A for a telephone dial according to the invention is completely assembled.

According to an embodiment of this invention, the chamber 1 has a dimension of 25 mm×25 mm×50 mm, preferably 20 mm×20 mm×40 mm while the chamber 2 has a radius of 22 mm and a length of 28 mm. However, it should be understood that there are no limits in these dimensions. It is of importance that the pinion 3 must be positioned at the exact center portion of the inside of the timer body A. Further, it may be admitted to disposed an air tank of a flexible material in order to prevent the liquid from shrink.

The principle of the operation of the governor A according to the invention is based on the power of friction resistance against the movement of the piston 7 due to the liquid contained in the governor A.

At first, referring again to FIGS. 1 and 2, when the dial plate 17 is dialed, the axis 6 is rotated and thereby the spring 19 becomes compressively wound and at the same time the pinion 4 is rotated in the direction of the arrow $R_1$, namely clockwise. The rotation of the pinion 4 permits the rack 3 to move in the direction of the arrow $R_2$. As a consequence, the piston 7 also moves to the same direction $R_2$ and thus the liquid 16 in the side of the chamber 1 is compressed and moves into the side of the chamber 2 therefrom. At this time, the movement of the liquid 16 is established in the directions $R_3$ and $R_4$ through the hole 9 via the hole 12. In the movement of the liquid 16, the rubber plate 8 is bent forward by the friction power against the liquid. The folded portions 8' and 8' of the plate 8 can be more inwardly bent by the same friction power and hence a small portion of the liquid can be run into the chamber 2 via the holes 9 and 12 as well as the gap formed between the inner wall of the chamber and the folded peripheral edge of the rubber plate 8.

To the contrary, when the dial plate 17 is returned to the original position by means of the spring 19, the axis 6 is rotated to the right and thereby the pinion 3 moves to the left. Accordingly, the rack 4 moves to the left as shown in FIG. 3, and at this time, as the piston 7 also moves to the left, the liquid 16 in the chamber 2 is compressed and thereby it flows into the chamber 1 through the hole 12 via the hole 9. However, at that time, the liquid 16 can not pass the gap defined between the inner side wall and the folded peripheral portions 8' and 8' of the plate 8 because, as shown in FIG. 3, such a gap can not be formed in the case of this embodiment. In addition, in the case, since the positioning of the hole 12 is made in a crossed position to that of the hole 9, if the return of the dial plate 17 is interrupted by outer forces such as artificial forces, an alternation of the resilient force of the spring 19 or the like and thereby the pressure acting on the piston 7 is increased, the peripheral portion folded outwardly of the plate 8 is accessible to the front of the piston 7 and thus the passage of the liquid becomes narrower in size. Consequently, the piston 7 is subjected to a greater flow resistance and therefore, it can always be returned to its original position within a predetermined interval irrespective of outer forces.

As discussed in the foregoing, the rotation movement of the axis secured to the telephone dial plate makes it possible to change linearly reciprocal movement via a pinion and a rack. By this linearly reciprocal movement there is effected a reciprocal movement of the piston in the cylindrical chamber due to the power of resistance of the liquid against the piston.

The present invention has been shown and described in what is considered to be the most practical, and most preferred, embodiments. It is recognized, however, that departures may be made therefrom within the scope of the invention and that obvious modifications will occur to persons skilled in the art.

What is claimed:
1. In combination with a telephone dial and return spring therefor, a liquid-sealed type of a governor which is comprised of:
(a) a rectangular hexahedral chamber in a liquid-sealed body, said chamber including a pinion engaged with a rack disposed in a recess formed on one of the vertical side walls of said chamber whereby said rack can move reciprocably, said pinion being operatively secured to said dial through the lower end of the axis extended downwardly from the dial plate of said telephone dial;
(b) a cylindrical chamber directly connected to said rectangular hexahedral chamber, said cylindrical chamber including a piston dividing the same into two sub-chambers, said piston being secured to said rack at one end thereof and having a small hole at the lower part thereof and said piston including a circular resilient plate having a small hole at the center part thereof and said plate being bent at its peripheral edge and fixed to a circular compressive plate whereby said small holes permit communication between said sub-chambers;
(c) a closure at one side of said body; and
(d) a liquid inlet at the opposite side of said body.

* * * * *